United States Patent [19]

Inagaki et al.

[11] 4,191,675

[45] Mar. 4, 1980

[54] FIRE SPREADING INHIBITOR COMPOSITION

[75] Inventors: Yutaka Inagaki; Hironaga Matsubara; Kojiro Ishise, all of Osaka, Japan

[73] Assignee: Sumitomo Electric Industries, Ltd., Osaka, Japan

[21] Appl. No.: 778,281

[22] Filed: Mar. 16, 1977

[30] Foreign Application Priority Data

Mar. 16, 1976 [JP] Japan ................................ 51/28879

[51] Int. Cl.$^2$ ............................................. C09K 3/28
[52] U.S. Cl. ................................. 260/29.3; 252/8.1; 260/29.6 NR; 260/38; 260/DIG. 24
[58] Field of Search ...... 260/29.3, 29.6 NR, DIG. 24; 252/8.1

[56] References Cited

U.S. PATENT DOCUMENTS

| | | | |
|---|---|---|---|
| 2,536,978 | 1/1951 | Fordemwalt | 260/15 |
| 3,630,764 | 12/1971 | Shannon | 106/15 |
| 3,642,531 | 2/1972 | Peterson | 428/921 |
| 3,928,210 | 12/1975 | Peterson | 260/29.6 R X |

*Primary Examiner*—Herbert B. Guynn
*Attorney, Agent, or Firm*—Sughrue, Rothwell, Mion, Zinn and Macpeak

[57] ABSTRACT

A fire spreading inhibitor composition comprising about 20 to about 40% by weight of an emulsion of a synthetic resin, about 1 to about 15% by weight of non-fusible organic fibers, about 20 to about 70% by weight of an inorganic powder at least about 50% of which is clay and/or zinc borate, and about 5 to 20% by weight of a halogenated hydrocarbon, all percentages being based on the dry weight as a coating.

7 Claims, 2 Drawing Figures

FIRE SPREADING INHIBITOR COMPOSITION

BACKGROUND OF THE INVENTION

1. Field of the Invention

This invention relates to a fire spreading inhibitor composition.

2. Description of the Prior Art

Building materials and cables, etc. made of combustible materials, especially combustible plastics such as polyethylene or polyvinyl chloride, readily burn in the event of fire, and the fire may spread to other objects and cause the danger of conflagration of houses and other facilities. It has been the previous practice, therefore, to coat fire spreading inhibitor compositions (often referred to "fire protective composition" or "fire retardant" by one skilled in the art) on the surfaces of such combustible materials to prevent the spreading of fire.

SUMMARY OF THE INVENTION

An object of this invention is to provide a fire spreading inhibitor composition with a superior performance not heretofore attainable.

The present invention provides a fire spreading inhibitor composition comprising about 20 to about 40% by weight of an emulsion of a synthetic resin, about 1 to about 15% by weight of non-fusible organic fibers, about 20 to about 70% by weight of an inorganic powder at least 50% of which is clay and/or zinc borate, and about 5 to about 20% by weight of a halogenated hydrocarbon, all percentages being based on the dry weight of the composition as a coating.

DETAILED DESCRIPTION OF THE INVENTION

Figure 1:
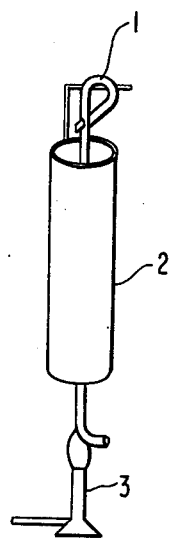
FIGS. 1 and 2 show equipment arrangements used in performance of evaluations conducted in the examples.

The fire spreading inhibitor composition of this invention is especially effective against objects requiring flexibility, weatherability and water resistance, such as cables. For simplicity, features and advantages of the invention will be described hereinbelow with special regard to cables. Needless to say, however, the composition of this invention is also effective against other combustible objects such as building materials in general.

Polyethylene and polyvinyl chloride, for example, have been used heretofore as coverings or jackets for insulators and sheaths, etc. of electric wires and cables. In the event of fire, these combustible coverings will burn and permit the propagation of the flame and are highly likely to cause damage to a control room and other electric facilities, and thus increase the loss due to fire. In order to prevent such a situation, attempts have been made to coat electric wires and cables with foamable or non-foamable fire spreading inhibitor compositions. For example, U.S. Pat. No. 3,642,531 discloses a typical example of a conventional fire spreading inhibitor composition which comprises a synthetic resin emulsion, inorganic fibers such as asbestos, and a halogenated hydrocarbon as main ingredients and an inorganic filler such as calcium carbonate or silica as an additional ingredient.

However, the inorganic fibers used in such an inhibitor composition may cause operational troubles during the manufacture of the inhibitor composition. Usually, glass and asbestos are used as the inorganic fibers. Both of these fibers tend to adversely affect working personnel during manufacture, and therefore not preferred. In particular, asbestos is detrimental to the health of working personnel, and the spraying of a composition containing asbestos is lawfully prohibited under some conditions to eliminate hazardous working conditions.

Furthermore, the fire spreading inhibition effect of such a conventional composition is not entirely satisfactory. When a flame comes into contact with a cable coated with the inhibitor composition, cracks occur in that portion of the cable which is vertically oriented whereby the combustible covering, such as polyethylene, inside the coating comes out and catches fire.

All of these defects have been successfully eliminated with the fire spreading inhibitor composition of the invention.

A first feature of the invention lies in the use of organic fibers which are non-fusible, i.e., do not melt when heated. Examples of suitable organic fibers are phenolic resin fibers such as "Kaynol" (registered trademark for a product of Japan Kaynol Co., Ltd.), polyimide fibers, polyamideimide fibers, and completely aromatic polyamide fibers such as "Nomex" (tradename, a product of E. I. du Pont de Nemours & Co.). Phenolic resin fibers are especially preferred. It has been found that these organic fibers used in place of the inorganic fibers fully meet the characteristics required of fireproofing composition, such as strength, and exhibit a satisfactory fire spreading inhibition effect, and moreover, the problem of hazardous working conditions can be solved.

When the amount of the organic fibers is less than about 1% by weight, cracks may occur in the coated composition during a fire. If the amount is more than about 15% by weight, the coatability of the composition becomes poor. For operational purposes, amounts of about 1 to 5% by weight are preferred.

A second characteristic feature of the present invention is the use of an inorganic powder at least about 50% of which is clay and/or zinc borate. When an ordinary inorganic powder such as calcium carbonate or silica is used as disclosed in Japanese Patent Application (OPI) No. 4979/73, a cracking of the coating of the composition formed on a vertically placed cable occurs upon contact with a flame, and combustible materials such as polyethylene inside the cable comes out and catch fire. In such a case, the coating of the fire spreading inhibitor composition becomes useless since the combustible material is exposed and is no longer covered. After extensive investigations about this point, it was found that when a powder comprising clay and/or zinc borate is used, the heat of the flame causes the clay and/or zinc borate to form a hard shell upon contact with the flame, and a flowing of the combustible materials such as polyethylene to the outside is prevented. It was also found that if the amount of the powder is about 20 to about 70% by weight, and at least about 50% of the entire powder is clay and/or zinc borate, even the combined use therewith of another inorganic powder such as aluminum hydroxide or calcium carbonate can lead to the formation of a sufficiently hard shell and prevent the fire from spreading.

When aluminum hydroxide is used in combination as an inorganic powder, the amount of smoke occurring during burning is reduced, and the fire spreading inhibition effect of the resulting inhibitor composition is especially good.

If the total amount of the inorganic powder is less than about 20% by weight, the fire spreading inhibition effect is reduced. If the total amount is above about 70% by weight, the suppleness of the coating is impaired.

The synthetic resin emulsion used in the composition of this invention may be an aqueous emulsion of polyvinyl acetate, an ethylene/vinyl acetate copolymer (EVA), a vinyl acetate/vinyl chloride copolymer, an ethylene/vinyl acetate/vinyl chloride terpolymer, etc. For application to cables, an ethylene/vinyl acetate copolymer emulsion is especially preferred because of its superior water resistance and weatherability.

When the amount of the synthetic resin emulsion on drying is below about 20% by weight, the resulting coating of the inhibitor composition is not supple. If the amount is above about 40% by weight, the fire spreading inhibition effect is not sufficient.

On the other hand, when the amount of the halogenated hydrocarbon which is conventionally used as a flame retardant, e.g., chlorinated paraffin, chlorinated naphthalene, hexabromobenzene, etc., is less than about 5% by weight, the fire spreading inhibition effect is not sufficient. If the amount exceeds about 20% by weight, the fire spreading inhibition effect does not increase very much, and the amount of chlorine type gases disadvantageously increases.

Preferably, a fire retardant such as antimony trioxide is added to the inhibitor composition of the invention in an amount of about 1 to about 10% by weight based on the inhibitor composition.

Conventional additives may be incorporated in the inhibitor composition of the invention in such amounts that do not adversely affect the effects of the present invention.

The amounts of the ingredients of the fire spreading inhibitor composition of the invention are described in the present application on the basis of the ingredients of the fire spreading inhibitor composition which has been coated on a material to be protected from fire spreading, such as electric cables, and then dried. Before coating, the ingredients have such a viscosity that they can be coated by generally employed coating methods using, for example, a spatula, a brush, or a sprayer. As needed, water is added to the inhibitor composition to dilute and adjust its viscosity.

The present invention will be explained in more detail with reference to Examples and accompanying drawings.

EXAMPLES 1 TO 7 AND COMPARATIVE EXAMPLES 1 TO 8

Various fire spreading inhibitor compositions having ingredients shown in Table below were prepared by mixing each component shown in Table below and adding water to the mixture such that the solid component is 55% by weight based on the resulting mixture to adjust the viscosity thereof followed by mixing it using conventional rolls.

Each of the compositions thus obtained was coated on a 3.5 sq 3-core CEE cable (polyethylene insulated polyethylene sheath cable comprised by a three-ply cable made of three cores (conductors) each having a section of 3.5 mm² and being coated thereon a 1 mm thick polyethylene insulation, said three-ply cable having thereon a polyethylene sheath of 1 mm in thickness.) to a thickness of about 2 mm.

As shown in FIG. 1 of the accompanying drawings, the resulting coated cable 1 was placed perpendicularly in an iron pipe 2, and heated from below for 20 minutes with a Bunsen burner 3. A determination was then made whether cable 1 burned or not. The results representing the fire spreading inhibition effect obtained are shown in Table below. In Table, O means that the fire did not spread over the cable; and X means that the fire spread over the cable.

Figure 2:
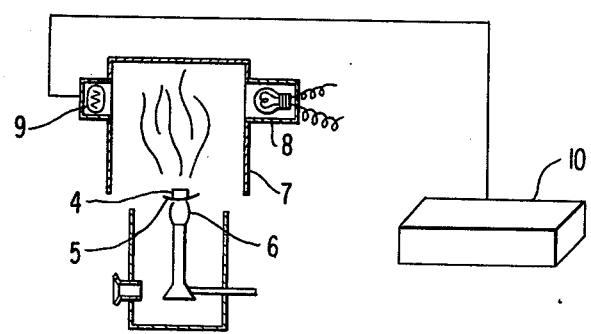

Furthermore, as shown in FIG. 2, 0.5 g of a sheet 4 of the inhibitor composition of the invention, 1 mm thick, was placed on a wire gauze 5 made of stainless steel, and heated with a burner 6 from below. A glass vessel 7, 30×30×40 cm in size, was put thereover, and a lamp 8 was placed on one side of the glass vessel. The light transmitted from lamp 8 to the other side was detected by a photoelectric tube 9. The amount of light transmitted was measured with an mV recorder 10, and the light transmittance (%) was a measure of the amount of smoke generation. These results are also shown in Table below.

Table

| Fire Spreading Inhibitor Composition (% by wt.) | Comparative Example | | | | | | | | Example | | | | | | |
|---|---|---|---|---|---|---|---|---|---|---|---|---|---|---|---|
| | 1 | 2 | 3 | 4 | 5 | 6 | 7 | 8 | 1 | 2 | 3 | 4 | 5 | 6 | 7 |
| Ethylene/Vinyl Acetate Copolymer[*1] | 25 | 25 | 20 | 20 | 50 | 10 | 20 | 20 | 30 | 40 | 20 | 20 | 40 | 20 | 20 |
| Asbestos[*2] | 20 | 20 | — | — | — | — | — | — | — | — | — | — | — | — | — |
| Phenolic Fibers[*3] | — | — | — | 15 | 10 | 15 | 30 | 1 | 5 | 5 | 5 | 1 | 15 | 10 | 2 |
| Calcium Carbonate | 15 | — | 10 | — | — | — | — | 10 | — | — | — | 10 | — | 10 | 10 |
| Aluminum Hydroxide | 20 | — | 20 | 15 | 5 | 10 | 10 | 20 | 20 | 10 | 10 | 20 | 10 | 15 | 15 |
| Clay[*4] | — | 20 | 10 | 20 | 5 | 20 | 20 | 20 | 10 | 10 | 10 | 20 | 5 | 20 | 20 |
| Zinc Borate[*5] | — | 15 | 15 | 10 | 5 | 10 | 5 | 20 | 15 | 15 | 20 | 10 | 5 | 10 | 20 |
| Talc[*5] | — | — | — | 10 | — | 10 | — | 5 | — | — | — | — | — | — | 5 |
| Magnesium Carbonate[*5] | — | — | — | — | — | 10 | — | — | — | — | 10 | — | — | — | — |
| Chlorinated Paraffin 70[*6] | 10 | 10 | 5 | 3 | 15 | — | — | 5 | 10 | — | 10 | — | 15 | 5 | 5 |
| HB[*7] | — | — | — | — | — | 5 | 5 | — | — | 10 | — | 9 | — | — | — |
| Antimony Trioxide[*5] | 5 | 5 | 2 | 2 | 5 | 5 | 5 | 1 | 5 | 5 | 5 | 5 | 5 | 5 | 3 |
| Plasticizer (Dioctyl phthalate) | 5 | 5 | 3 | 5 | — | 5 | 5 | — | 5 | 5 | 5 | 5 | 5 | 5 | — |
| Property Evaluated | | | | | | | | | | | | | | | |
| Fire Spreading Inhibition Effect | X | 0 | X | X | X | 0 | 0 | 0 | 0 | 0 | 0 | 0 | 0 | 0 | 0 |
| Percent Transmittance, % | 67 | 48 | 68 | 70 | 54 | 76 | 64 | 75 | 65 | 62 | 70 | 73 | 60 | 70 | 73 |
| Workability at Time of Manufacture | X | X | 0 | 0 | 0 | 0 | 0 | 0 | 0 | 0 | 0 | 0 | 0 | 0 | 0 |
| Suppleness[*8] | 0 | 0 | 0 | 0 | 0 | X | 0 | X | 0 | 0 | 0 | 0 | 0 | 0 | 0 |

Table-continued

| Fire Spreading Inhibitor Composition (% by wt.) | Comparative Example | | | | | | | | Example | | | | | | |
|---|---|---|---|---|---|---|---|---|---|---|---|---|---|---|---|
| | 1 | 2 | 3 | 4 | 5 | 6 | 7 | 8 | 1 | 2 | 3 | 4 | 5 | 6 | 7 |
| Coatability*9 | 0 | 0 | 0 | 0 | 0 | 0 | X | 0 | 0 | 0 | 0 | 0 | 0 | 0 | 0 |

*1 Molar ratio of Ethylene/Vinyl Acetate is 15/85.
*2 According to JIS 7TS.
*3 "Kaynol" (a registered trademark for a product of Japan Kaynol Co., Ltd.) of about 2 denier and about 3 to 5 mm in length.
*4 "Hard Top Clay" (a registered trademark for a product of Shiroishi Calcium Co., Ltd.) of a particle size of 1 to 10 μ.
*5 Particle size 1 to 10 μ.
*6 Degree of chlorination: 70% (a product of Ajinomoto Co., Ltd.)
*7 2,2-Di(2-bromoethoxy-2,5-dibromophenyl)propane "Fire Guard 3,000" (a tradename for a product of Teijin Limited)
*8 The coated 3 × 2 sq. CEE cable was bent in a diameter 5 times larger than the original diameter, and the presence or absence of cracking was determined.
*9 The composition was diluted with water to a solids content of 50% by weight, and whether this diluted coating could be sprayed by a Solacoap gun (W701, a product of Iwata Tosoki Seizo K.K.) was determined.

Designations "O" and "X" used in Table above indicate "good" and "poor", respectively.

While the present invention has been described in detail with reference to the specific embodiment thereof, it is apparent to one skilled in the art that various changes and modification can be made therein without departing the scope and the spirit of the present invention.

What is claimed is:

1. A fire spreading inhibitor composition comprising about 20 to about 40% by weight of an emulsion of a synthetic resin, about 1 to about 15% by weight of infusible organic phenolic resin fibers which exhibit a fire spreading inhibition effect, about 20 to about 70% by weight of an inorganic powder at least about 50% of which is clay and/or zinc borate, and about 5 to 20% by weight of a halogenated hydrocarbon flame retardant, all percentages being based on the dry weight as a coating.

2. The composition of claim 1, wherein the synthetic resin is an ethylene/vinyl acetate copolymer.

3. The composition of claim 1, wherein said synthetic resin emulsion is an aqueous emulsion of polyvinylacetate, an ethylene/vinylacetate copolymer, a vinylacetate/vinylchloride copolymer or an ethylene/vinylacetate/vinylchloride terpolymer.

4. The composition of claim 1, wherein said halogenated hydrocarbon flame-retardant is chlorinated paraffin, chlorinated naphthalene or hexabromobenzene.

5. A fire spreading inhibitor composition as claimed in claim 1, wherein at least 50% of said inorganic powder is clay.

6. A fire spreading inhibitor composition as claimed in claim 1, wherein at least 50% of said inorganic powder is zinc borate.

7. A fire spreading inhibitor composition as claimed in claim 1, wherein at least 50% of said inorganic powder is clay and zinc borate.

* * * * *